Aug. 13, 1929. E. J. VON HENKE 1,724,381
WELDING MACHINE
Filed Nov. 6, 1926 4 Sheets-Sheet 2
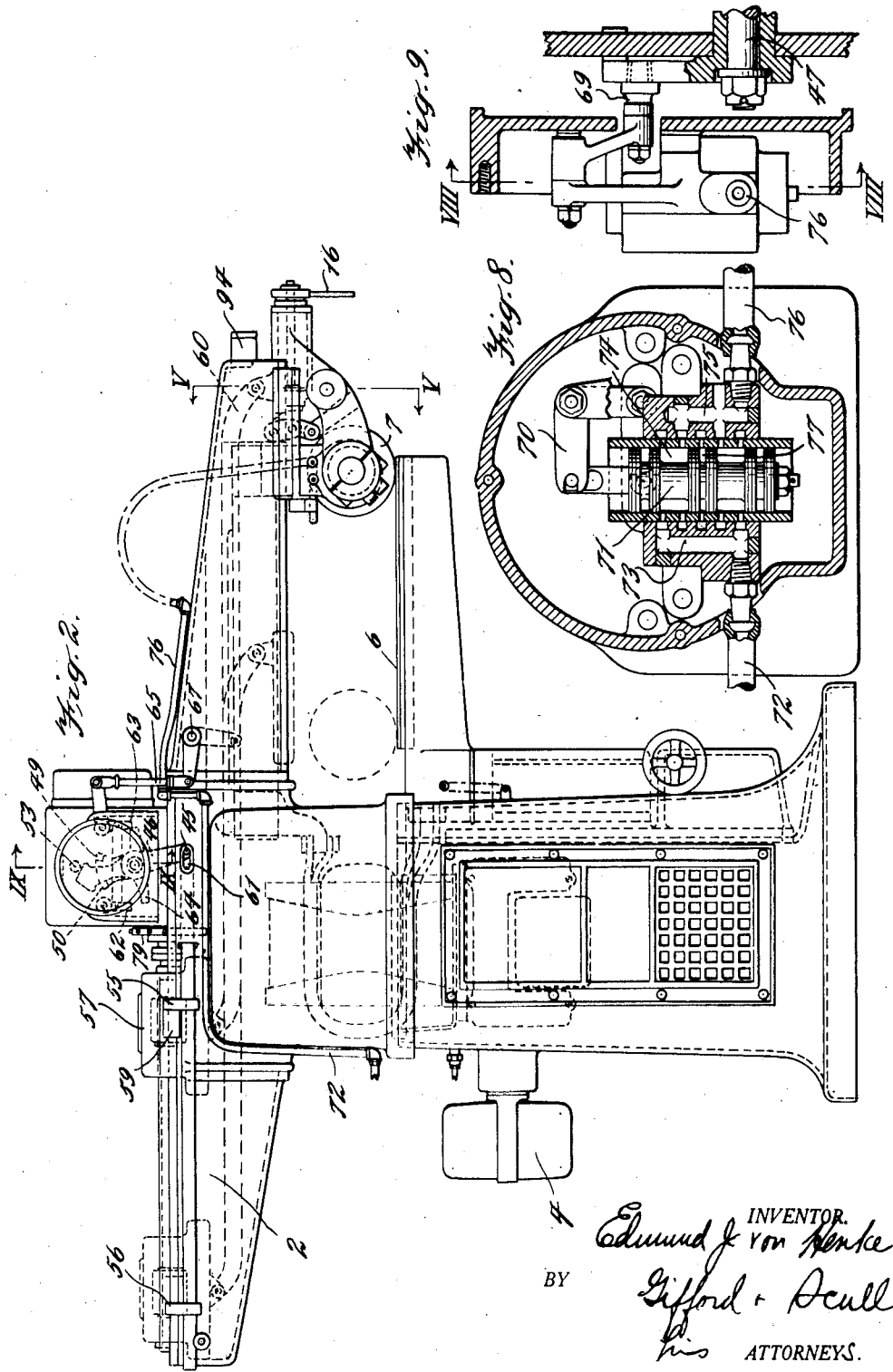
INVENTOR.
Edmund J. von Henke
BY
Gifford + Scull
his ATTORNEYS.

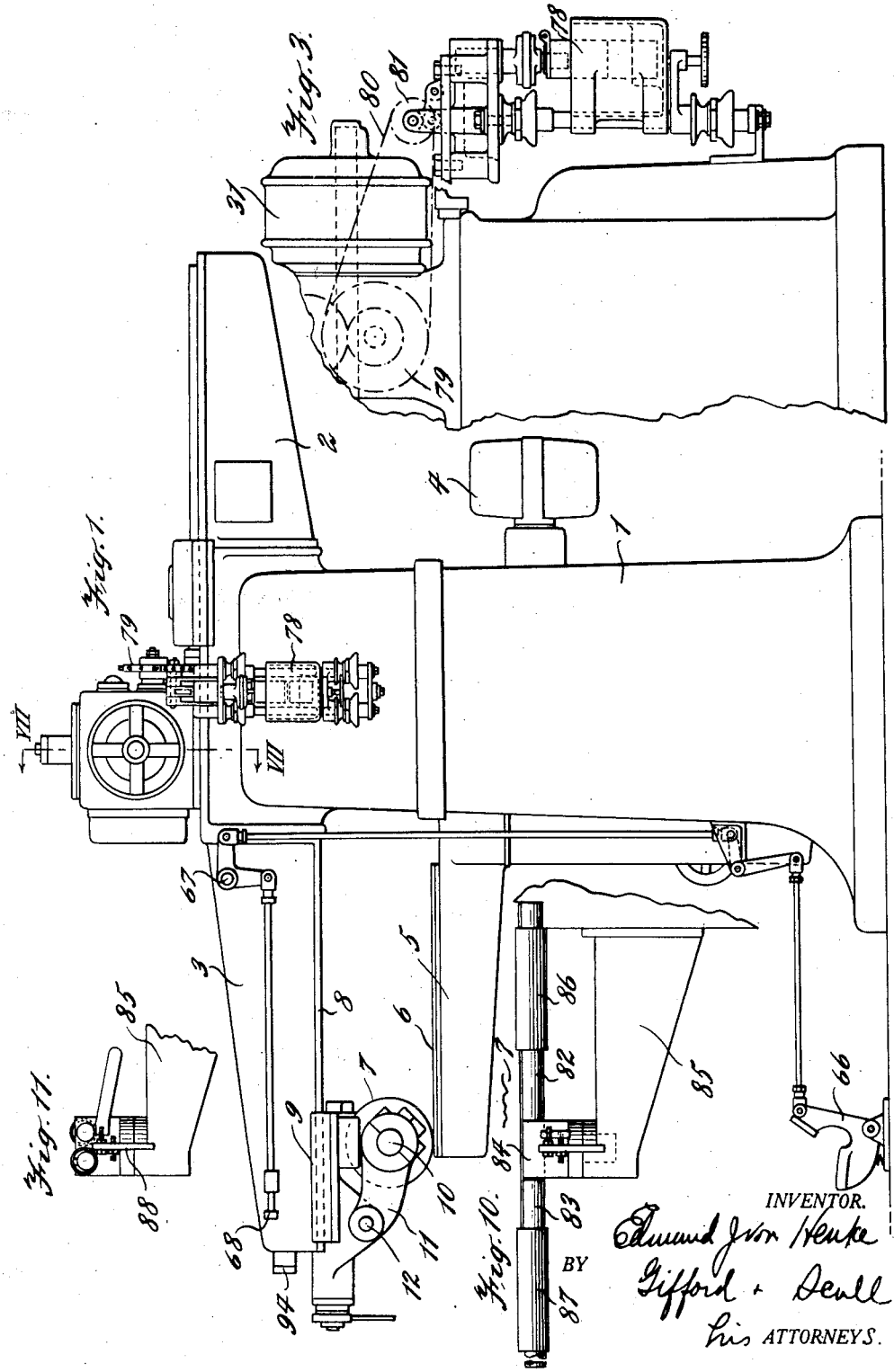

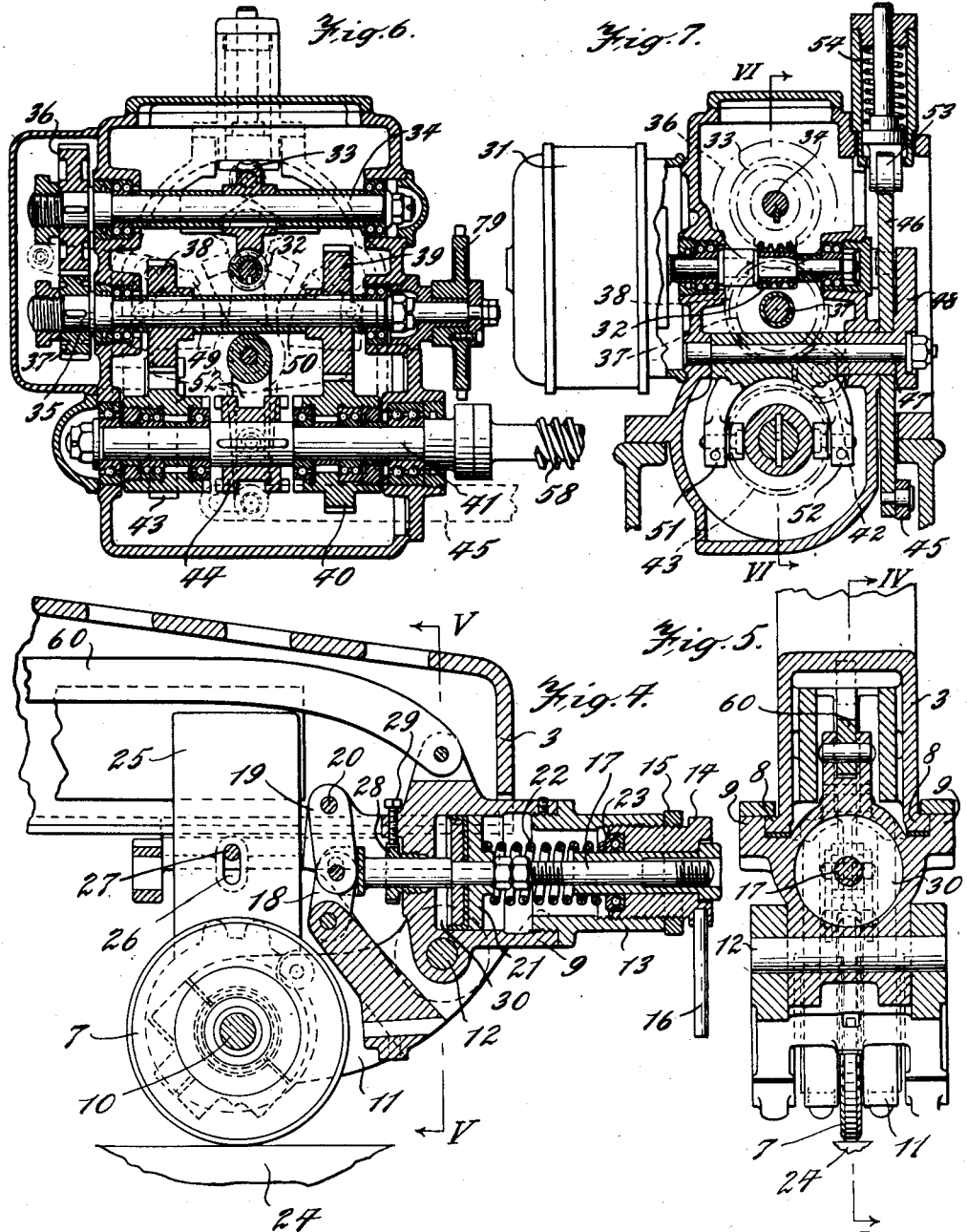

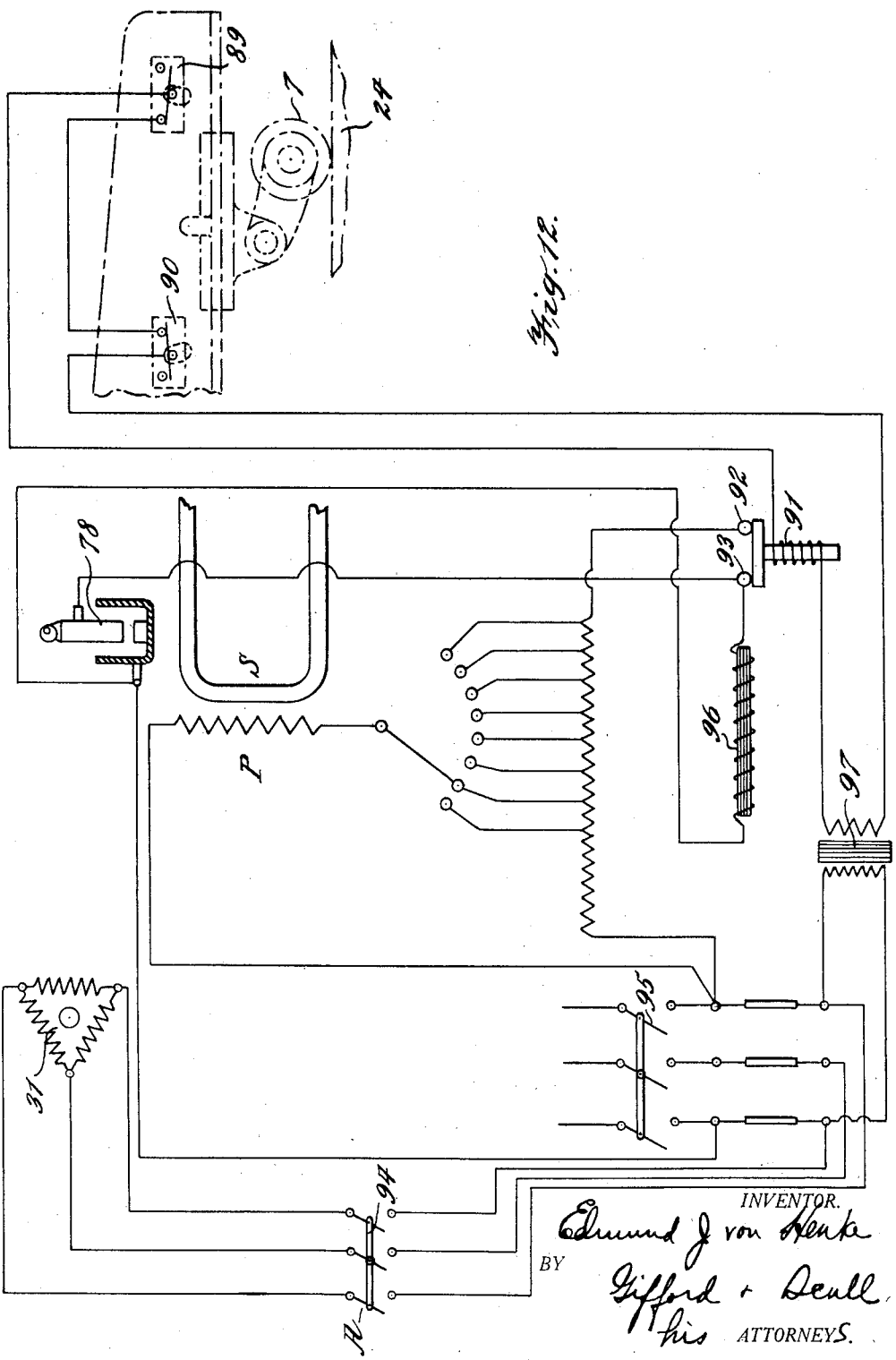

Patented Aug. 13, 1929.

1,724,381

UNITED STATES PATENT OFFICE.

EDMUND J. von HENKE, OF CHICAGO, ILLINOIS, ASSIGNOR TO AMERICAN ELECTRIC FUSION CORPORATION, OF CHICAGO, ILLINOIS, A CORPORATION OF ILLINOIS.

WELDING MACHINE.

Application filed November 6, 1926. Serial No. 146,583.

My invention relates to welding machines and is particularly useful in seam welders.

My invention will be better understood by reading the following description taken in connection with the accompanying drawings, in which—

Fig. 1 is a side elevation of one side of the machine;

Fig. 2 is a side elevation of the other side of the machine;

Fig. 3 is a side elevation of the interrupter;

Fig. 4 is a section of the electrode operating cylinder and connections on line IV—IV of Fig. 5;

Fig. 5 is a section on line V—V of Figs. 2 and 4;

Fig. 6 is a section on line VI—VI of Fig. 9;

Fig. 7 is a section on line VII—VII of Fig. 1;

Fig. 8 is a section on line VIII—VIII of Fig. 9, showing the air control valve;

Fig. 9 is a section on line IX—IX of Fig. 2;

Fig. 10 is a side elevation of a modified horn and fixed electrode;

Fig. 11 is a view of the device shown in Fig. 10 rotated 90 degrees; and

Fig. 12 is a diagram of the electrical circuits involved.

The machine comprises a casing 1 and supports 2 and 3 on opposite sides of the casing, the support 3 acting as the upper horn of the machine. The casing 1 contains the usual transformer and autocoil which per se form no part of this invention. The control switches are located in the clapper box 4 which may be placed in position by merely plugging in the same.

The casing 1 also supports a lower horn 5 carrying a fixed electrode 6. A reciprocable electrode 7 is mounted on the upper horn 3. The construction of this electrode which preferably takes the form of a disk, is shown in detail in Fig. 4, together with the mechanism for operating the same, and will now be described. The horn or support 3 is provided with guides 8 with which the supporting member 9 engages, as best shown in Fig. 5. By this means the disk electrode and its operating parts may be reciprocated by sliding engagement between the members 8 and 9. The disk 7 is mounted on a shaft 10 carried by an arm 11 pivoted at 12 to the casing or supporting member 9. A cylindrical member 13 is screw-threaded into the member 9 and a nut 14 is screwed into the member 13. A lock nut 15 acts to hold the member 14 in position and a handle 16 is provided for adjusting the member 14, for a purpose which will appear later. A rod 17 extends through the members 9, 13 and 14 and connects at one end with the toggle levers 18 and 19. One end of the lever 18 is connected with the member 11 and one end of the member 19 is connected to the stationary part of the member 9 at 20. The rod 17 is provided with a piston 21 which moves in a cylinder formed in the member 9. A spring 22 surrounds the rod 17 and has one end bearing against the piston 21 and the other against a roller-bearing member 23, which in turn rests against a chambered portion of the adjustable nut 14. The spring 22 is normally under compression and tends at all times to move the rod 17 to the left to straighten out the toggle levers 18 and 19 and force the disk electrode 7 against work 24 with considerable pressure.

A vertical member 25 is attached to the disk shaft 10 and is provided with a slot 26 in which is contained a pin 27 which limits both the upward and downward movement of the disk 7.

An air-packing ring 28 is placed around the rod 17 and is held in position by a set screw 29.

An air-supply pipe connects with a chamber 30 of the piston in the member 9 and through means which will be later described, air or other fluid under pressure may be admitted to the chamber 30 to force the piston 21 to the right, as viewed in Fig. 4, and thereby compressing the spring 22 and raising the disk 7 from the work 24.

In operation, particularly in welding a seam or a series of spot welds, it is desirable that the disk 7 be reciprocated back and forth over the fixed electrode 6, the work being placed upon the horn or support 5 so that the part to be welded will be so situated that the disk 7 will move thereon and effect the weld. The means for reciprocating the disk are shown in detail in Figs. 6 and 7, and will now be described. These means comprise a motor 31 having a worm 32 which engages a worm gear 33 on a shaft 34. The shaft 34 is geared to a shaft 35 by spur gears 36 and 37. The shaft 35 carries two pinions 38 and 39. Pinion 39 meshes directly with the pinion 40 on a shaft 41 and the pinion 38 meshes with a reversing gear 42, which in turn, meshes with pinion 43 on the shaft 41. Both the pinions 40 and 43 are loosely mounted so as to freely rotate upon the shaft 41. A clutch 44 is also mounted on the shaft 41 and is adapted to be moved into engagement with either of the gears 40 or 43. The clutch member 44 is keyed to the shaft 41 so that the shaft rotates with the member 44. Obviously by engaging the clutch member 44 with the gear 40 the shaft 41 will be rotated in one direction and by engaging it with the gear 43 it will be rotated in the opposite direction.

The clutch is actuated through a link connection 45 which engages an arm 46 mounted upon a pin 47. The pin 47 also carries a member 48 which has two lugs 49 and 50 thereon. The member 48 also has arms 51 and 52 which engage the clutch member 44. The member 46 engages a spring-pressed roller 53 so that when the link 45 moves the arm 46 so that the roller 53 passes over the peaked top of the member 46 the spring 54 causes a quick movement of the member 46 which engages one or the other of the lugs 49 or 50 and acts to throw the clutch into engagement with the gear 40 or 43 with a positive, quick or snap action, and the spring also acts to hold the clutch in engagement until it is properly released.

As above stated, the link 45 connects at one end with the member 46, as shown in Fig. 2, and extends along the support 2 and is provided with adjustable abutments 55 and 56. A block 57 is mounted on the support 2 and contains a nut into which a screw 58 works. The screw 58 is mounted on the end of the shaft 41 and is rotated in one direction or the other depending upon the clutch 44. The block 57 carries a projection 59 which is adapted to engage the abutments 55 and 56 on the member 45 so that the clutch will be automatically operated at the end of the travel of the block 57 to cause a return movement of the block.

The member 9 is connected to the block 57 by a link 60 so that the disk 7 is reciprocated along the fixed electrode 6 by the movement of the block 57.

Since it is preferred that the motor shall continually rotate while the machine is in use, means are provided whereby the action of the devices above described merely disconnect the clutch 44 at the end of each movement of the block 57. These means comprise the link 45 which has a slot 61 in the end connecting with the member 46. Stops 62 and 63 are provided for engaging a cross member 64 attached to the member 46 and link connections 65 which operatively connect the stops 62 and 63 with a foot treadle 66 through the shaft 67. As an illustration, if the parts are in the position shown in Fig. 2 and the block 57 is moved to the left, it will engage the abutment 56 which will move the link 45 to the left, rotating the member 46 in a clockwise direction until the member 46 engages the projection 49. The continued movement rotates member 48 which, in turn, disconnects the clutch member 44 from its operating gear and the member 64 engages the stop 62 immediately after the spring-pressed wheel 53 passes the peak of the member 46. When this position is reached the clutch is disengaged, the motor continues to operate, but the screw 58 is stationary. The parts remain in this position until the operator, either through the foot treadle 66 or the handle 68, rotates the shaft 67 which, in turn, through the link connection 65 removes the stop 62 from the member 64 whereupon the spring-pressed roller 53 causes the clutch to snap into engagement with the proper gear to move the block 57 to the right, as shown in Fig. 2.

Connected with the member 48 which is mounted on the shaft 47, is a pin 69 which in turn is connected with a bell crank 70 which operates the piston 71 of the air-control valve. The function of the air-control valve is such that when the disk reaches the limit of its movement in either direction and the clutch is disconnected, the air valve at the same time is operated from the connection above described to admit air or other fluid to the chamber 30 (Fig. 4) so as to operate the piston 21 to raise the disk from the work so that the work may be removed and another piece placed in position. The air under pressure is supplied through a pipe 72 to a chamber 73. With the valve in the position shown in Fig. 8. the air passes into the chamber 74 and from there into the chamber 75 and thence into the pipe 76 which leads into the chamber 30. With the air valve in the position shown, the parts shown in Fig. 4 would be moved so as to raise the disk from the work. Upon the actuation of the clutch the valve 71 will be moved up or down, depending upon the position of the clutch. In either case it will be noted that the air will be cut off from the pipe 76 and connected to the exhaust chamber 77 of the valve. This will relieve the pressure in the chamber 30 and permit the spring 22 to move disk 7 into engagement with the work.

The usual interrupter shown at 78 (Fig. 3) is provided which is connected to the shaft 35 through a sprocket 79 on that shaft, a chain 80 and a sprocket 81 on the interrupter shaft. The function of the interrupter is well known and acts to "chop"

the current for the purpose of preventing the accumulation of heat in the weld.

In Figs. 10 and 11, I have shown a modification in which a turret form of fixed electrode is illustrated. This electrode comprises two members 82 and 83 which are fastened in a head 84 which is rotatably carried by the lower horn 85. The advantage of this construction lies in the fact that while the disk 7 is being moved across the work 86 to weld the same, the previously welded piece of work 87 may be removed by the operator and a new piece placed in position. Upon completion of the welding of the piece 86 the turret is rotated, bringing the new piece 87 in position and the old piece in position to be removed and a new one substituted. A stop 88 is provided on the horn 85 to control the rotative movement of the head 84.

Placed along the path of the carriage for moving the disk 7, are two hatchway switches 89 and 90. These are adjustable and are so positioned that one of them will be actuated to open the welding circuit automatically before the air is admitted to chamber 30 for raising the disk 7 from the work. The switches are shown diagrammatically in Fig. 12. By referring to that figure it will be noted that the two switches are in series in the control circuit which includes the contactor 91. This contactor 91 closes the primary of the transformer circuit through contacts 92 and 93. When the circuit including the contactor 91 is deenergized the contacts 92 and 93 are open, thereby opening the primary transformer circuit. It will also be noted that the contacts of the switches 89 and 90 are held open until the carriage of the disk 7 is moved in a direction opposite to that which opens these contacts. This assures contact of the disk 7 with the work before the welding current is turned on and also the turning off of the welding current before the disk is separated from the work.

A switch 94 is placed in the circuit of the motor 31 and may be located at any convenient position on the machine. A main-line switch 95 is provided together with the usual fuses and other protective appliances. A high inductance 96 is placed around the contacts of the interrupter 78 for the purpose of avoiding mutilation of the interrupter contacts. The control circuit is supplied through a single phase transformer 97.

The electrodes may be cooled in any approved or desirable manner. The cooling arrangement has been omitted from the drawings for the purpose of simplification.

Summarizing the principal steps, the operation of the machine is as follows: With the parts in the position shown in Fig. 2, the disk is about completing its movement. As it nears the end of its travel the switch 89 will be opened and the welding current cut off. The clutch will be moved to neutral position whereupon the air valve will admit air to the chamber 30 to raise the disk from the work. A new piece of work will be placed upon the fixed electrode and the operator will operate either the foot treadle or handle, thus allowing the clutch to go into engagement and at the same time release the air and permit the disk to move into contact with the work. Upon a slight movement of the disk carriage the contact of switch 89 will be established and the welding current turned on. The disk will be moved across the work to complete the weld and the current will be automatically turned off and the disk raised from the work, as above explained.

By the construction above shown and described many practical advantages are secured inclusive of rapid and automatic operation of the reciprocable electrode; the application of a constant pressure between the electrodes and the work by reason of the spring actuating the reciprocable electrode; the turret arrangement of the fixed electrode makes it possible to increase the speed of the machine and other operative advantages will be apparent to those skilled in the art.

While I have shown one embodiment of a mechanism for carrying out my invention, I wish it understood that my invention is not limited to the exact details shown and described, but changes may be made in the details without departing from the spirit of my invention.

I claim:

1. In an electric welder, the combination of a fixed electrode, a reciprocable electrode, means for moving said reciprocable electrode along said fixed electrode, means for applying pressure to work between said electrodes, and means for raising and lowering said reciprocable electrode at the ends of its movements.

2. In an electric welder, the combination of a fixed electrode, a reciprocable electrode, means for moving said reciprocable electrode along said fixed electrode, means for applying pressure to work between said electrodes, and means for automatically raising and lowering said reciprocable electrode at the ends of its movements.

3. In an electric welder, the combination of an extended fixed electrode, a reciprocable disc electrode, a motor for moving said reciprocable electrode along said fixed electrode, connections, including a clutch, between said motor and said reciprocable electrode and means controlling said clutch for connecting said motor to operate said electrode in one direction and then in the other direction, and means for raising said electrode at the end of each stroke to permit the insertion of work between said electrodes.

4. In an electric welding machine, the combination of a frame, a stationary electrode, a reciprocable electrode, a carirage for the reciprocable electrode, means actuated by the carriage for controlling the welding circuit, and means actuated by the carriage for raising and lowering the reciprocable electrode at the end of each movement.

5. In an electric welding machine, a frame, a fixed electrode carried by said frame, a carriage movably mounted on said frame, a motor, means whereby said carriage is reciprocated by said motor, a contact carried by the carriage along said fixed electrode, means for pressing said movable electrode against work on the fixed electrode, means for raising said movable electrode away from work at the end of each stroke and means controlled by the carriage for controlling the welding current passing through the work.

6. In an electric welding machine, the combination of a fixed electrode, a movable electrode, automatic means for moving said electrode along the fixed electrode, means for automatically separating said electrodes at the end of a welding operation and resilient means for pressing work between said electrodes during the welding operation.

7. In a welding machine, the combination of a support, a carriage movable thereon, a disk electrode, a pivoted lever carrying said electrode, means for moving the lever to raise the electrode and resilient means for forcing the electrode downwardly into a welding position.

8. In a welding machine, the combination of a support, a carriage movable thereon, a disk electrode, a pivoted lever carrying said electrode, a toggle connected to said lever, means for operating the toggle to raise the electrode and to press the same downwardly into welding position.

9. In an electric welder, the combination of a support, guides thereon, a carriage movable on said guides, an electrode carried by said carriage, means for moving said carriage comprising a motor, a screw rotated by said motor, a block cooperating with said screw, means connecting said block with said carriage, a clutch between said motor and screw for controlling the direction of rotation of said screw, means for automatically disengaging said clutch when said carriage reaches a predetermined point, and means operatively connected with said clutch for controlling the raising and lowering of said electrode at the ends of its movements.

10. In an electric welder, the combination of fixed and movable electrodes, a fluid-operated piston for the up and down movements of said movable electrode, a motor for reciprocating said movable electrode and a valve operatively connected with the motor for controlling the operation of said piston.

11. In an electric welder, the combination of a fixed electrode, a movable electrode having up and down and reciprocable movements, a motor for reciprocating the movable electrode, a clutch in the motor connection, and means operatively connected with the clutch for moving the movable electrode up and down only at the ends of its reciprocable movements.

12. In an electric welder, the combination of a fixed electrode, a movable electrode having up and down and reciprocable movements, a motor for reciprocating the movable electrode, a clutch in the motor connection, a fluid-operated piston for moving the movable electrode up and down, and a control valve operatively connected with said clutch whereby the movable electrode is moved up and down at predetermined points in its reciprocable movements.

13. In an electric welder, the combination of a fixed electrode, a movable electrode having up and down and reciprocable movements, a motor for reciprocating the movable electrode, a clutch in the motor connection, a fluid-operated piston for controlling the up and down movement of said electrode, means operated by the motor at predetermined points for disengaging said clutch, and means controlled by the clutch for causing said piston to raise said movable electrode.

14. In an electric welder, the combination of a fixed electrode, a movable electrode having up and down and reciprocable movements, a motor for reciprocating the movable electrode, a clutch in the motor connection, a fluid-operated piston for controlling the up and down movement of said electrode, means operated by the motor at predetermined points for disengaging said clutch, and means controlled by the clutch for causing said piston to raise said movable electrode, and manually operable means for engaging the clutch and causing said movable electrode to be lowered into welding position.

EDMUND J. von HENKE.